A. L. SWEET.
Drill-Chuck.

No. 226,370.  Patented April 6, 1880.

Witnesses:
C. Clarence Poole
Warren Seely

Inventor:
Alonzo L. Sweet
by Ellis Spear
Attorney

N. PETERS, PHOTO-LITHOGRAPHER, WASHINGTON, D. C.

UNITED STATES PATENT OFFICE.

ALONZO L. SWEET, OF NORWICH, CONNECTICUT.

DRILL-CHUCK.

SPECIFICATION forming part of Letters Patent No. 226,370, dated April 6, 1880.

Application filed January 14, 1880.

*To all whom it may concern:*

Be it known that I, ALONZO L. SWEET, of Norwich, in the county of New London and State of Connecticut, have invented a new and useful Improvement in Lathe-Chucks; and I do hereby declare that the following is a full, clear, and exact description of the same.

My invention relates to lathe-chucks, and the object of the invention is to obviate the necessity of stopping the machine in order to change the drill or whatever instrument may be in use. This in the chucks in ordinary use, so far as known to me, is invariably the case, since the construction of the said chucks has been always such that the grasp of the chuck could not be relaxed without stopping the machine. This often requires more time than that consumed on the work itself.

By my improvement the chuck may be manipulated quickly and easily while in revolution, and consequently the time required in changing the tool or other object held in the chuck greatly lessened.

The form in which I have embodied my invention is shown in the accompanying drawings, in which—

Figure 1:
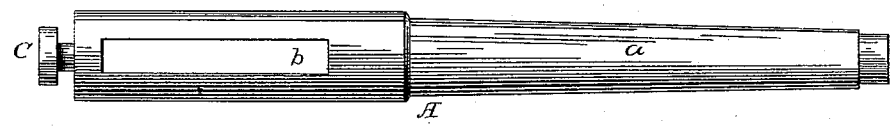
Figure 2:
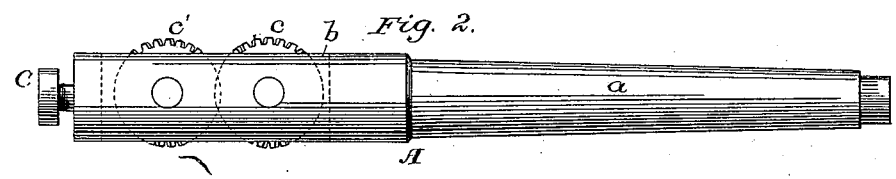
Figure 3:
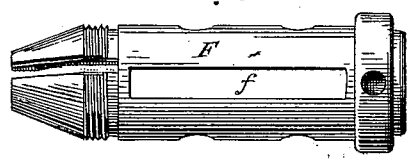
Figure 4:
Figure 5:
Figure 6:
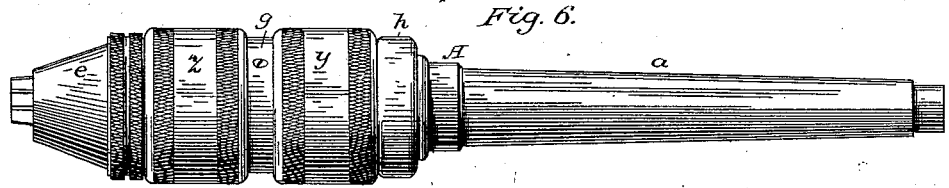

Figure 1 shows the arbor of the chuck with all the other parts removed. Fig. 2 represents the arbor in side view with the worm-gear in place. Fig. 3 shows a sleeve which is fitted to slide over the arbor. Fig. 4 shows an edge view of the worm-gear; Fig. 5, a side view of one of the jaws detached. Fig. 6 represents the collars or sleeves, the rings which hold them in place, and the conical shell for the compression of the jaws, all the parts being arranged in their proper order; and Fig. 7 is a central longitudinal section of the whole apparatus.

In these drawings, A represents the arbor of the chuck, with a tapering end, $a$, turned to fit the machine in which it is run. The forward part of this arbor is slotted, as shown at $b$, to receive worm-gears $c\ c'$ (shown in side view in Fig. 2) in place in the slotted arbor.

A lug, C, is shown on the forward end of the arbor, in the annular groove of which are fitted the jaws $d$, which are caused to move up and down within the inclined shell $e$, for the purpose of opening or closing the said jaws, as may be required.

Figure 7:
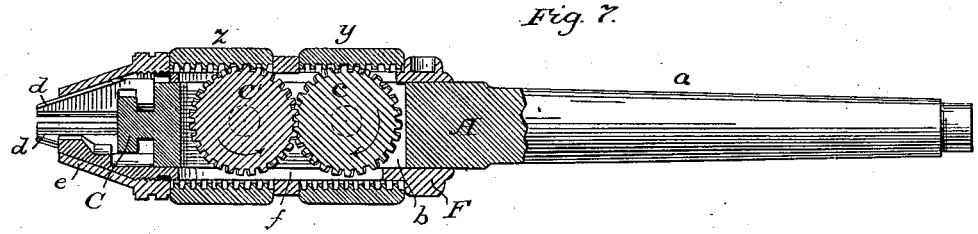

A sleeve, F, as shown in Fig. 3, is fitted to slide closely on the arbor A, and has a slot, as shown at $f$, to admit the worm-gears $c\ c'$ which project through the sleeve F on one side, as shown in Fig. 7, for purposes hereinafter explained.

The journals on which the worm-gears turn have their bearings in the walls of the slot in the arbor. The perforations for these journals are placed slightly to one side of the center of the arbor, which permits the gears to project through and to engage with the collar on one side only.

The teeth of the worm-gear are made slightly inclined in opposite directions, as shown in Fig. 4, to fit them to be operated upon by the collars $y$ and $z$. (Shown in Fig. 6.) Of these collars, $z$ is formed with an internal left-hand thread, and $y$ with an internal right-hand thread. The collar $y$ is held upon the sleeve between rings $g$ and $h$, so that only rotary movement is permitted upon the sleeve.

The collar $z$ is placed between the ring $g$ and the shell $e$, so that it, like the other, can have only rotary movement on the sleeve. The worm-gears, it will be observed, mesh with each other. When, therefore, supposing the chuck to be held with the tapering part toward the holder, the collar $y$ is turned over to the left, the gear $c$ will be turned in the direction of the arrow and the gear $c'$ forced in an opposite direction; but, as the gear $c'$ meshes into internal thread of the collar $z$, the effect of the described movement is to push the sleeve back upon the arbor and cause the jaws to protrude and approach each other. Movement of this collar in the opposite direction draws in and separates the jaws. As the collars are threaded reversely to each other, any movement of the collar $z$ will produce motion of the jaws in a direction opposite to that produced by the same movement of the collar $y$.

In practice, the chuck being in rotation, the opening or closing of the jaws is effected by simply holding one of the collars so as to prevent or retard its rotation with the chuck. One being arrested or retarded will move the jaws in one direction and the other in the opposite direction. If both be grasped, they counteract upon each other, and no effect is produced.

The rotary motion of the chuck itself is thus utilized to open and close the jaws, and it is never necessary to stop the machine for the purpose of changing the tool.

Having thus described my invention, what I claim, and desire to secure by Letters Patent, is—

1. The combination of the slotted arbor A, carrying jaws $d$ and worm-gears, with the sleeve F and collars $y$ $z$, the parts acting to open or close the jaws, as set forth.

2. The combination of the arbor A, gears $c$ $c'$, and collars $y$ and $z$ with the rings $g$ $h$ and sleeve F, substantially as set forth.

In testimony whereof I have signed my name to this specification in the presence of two subscribing witnesses.

ALONZO L. SWEET.

Witnesses:
 ALLEN TENNY,
 HOWARD L. STANTON.